R. W. McCELLAND.
BOX FOR CARRIAGE WHEELS.
No. 21,766. Patented Oct. 12, 1858.
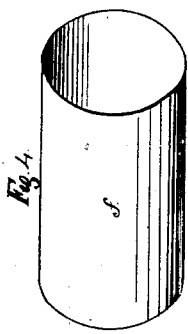
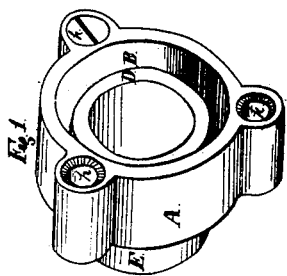
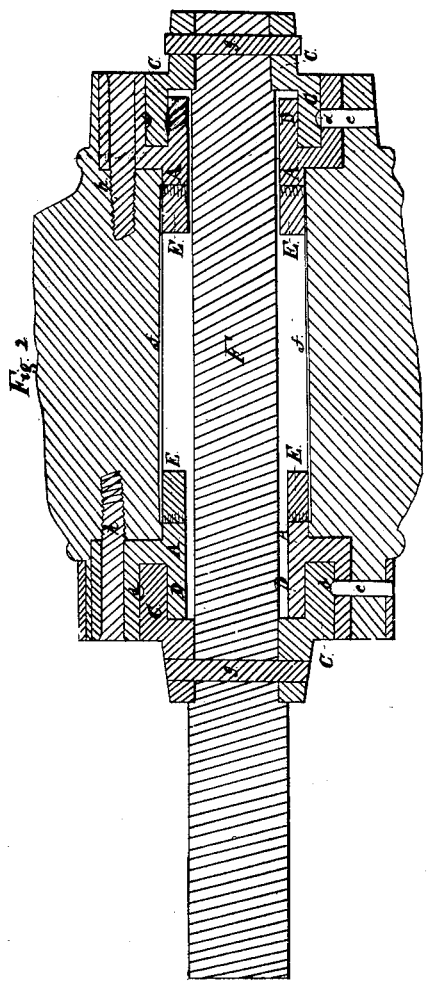
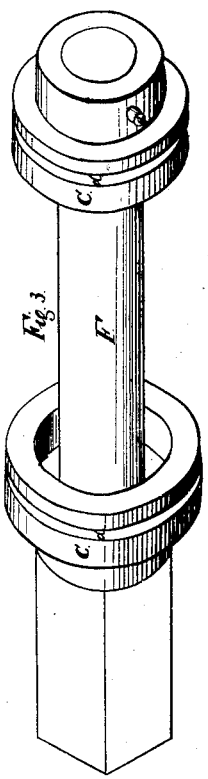
Inventor
R. W. McClelland

UNITED STATES PATENT OFFICE.

R. W. McCLELLAND, OF PEKIN, ILLINOIS.

BOX FOR CARRIAGE-WHEELS.

Specification of Letters Patent No. 21,766, dated October 12, 1858.

*To all whom it may concern:*

Be it known that I, R. W. McCLELLAND, of the city of Pekin, in the State of Illinois, county of Tazewell, have invented a new and useful improvement in hub and spindle boxes for wagons, carriages, and buggies, railroad-cars, or any other vehicle or machine to which such boxes will apply; and I do hereby declare that the following is a full, clear, and exact description of the construction and operation of the same, reference being had to the annexed drawing, making a part of this specification, in which—

Figure 1 is a perspective view of the hub box; Fig. 2 is an interior view of the hub, hub boxes, spindle and spindle boxes, to their proper places; Fig. 3 is a perspective view of the spindle and spindle boxes; Fig. 4 is a tin or metal tube fitting snug over the projecting flanges of the hub boxes, for the purpose of protecting the spokes and hub from oil.

Letter A is the hub boxes as is more fully represented by the accompanying drawing; this box is let into and fastened in the hub in the usual manner of fastening such boxes, with the addition if necessary, of bolts or screws, as represented by letters $h$; one particular advantage of a hub box being constructed in this manner is, the shoulders which receive and sustain the lateral motion and wear of the wheel, are entirely inside of the hub, and perfectly secure from dirt or sand, and consequently from as much liability to wear as though they were exposed at the outer ends of the hub, as is customary. The hub boxes, having a groove B and flange D, as represented in Fig. 1, with the spindle boxes C properly fitted into them, give a double direct bearing, and thereby reduces the wear.

F is the spindle.

C is a spindle box. Those at Fig. 3 represent them as prepared to work into the hub boxes, having the interior flange and groove, as represented in Figs. 1 and 2.

E are projecting flanges on the hub boxes, over which the tin or metal tube $f$, is placed for the purpose of preventing the oil from getting to the ends of the spokes.

$d$ is an oil groove in the spindle box.

$e$ is an oil hole.

$f$ is the tin or metal tube.

$g$ is the linch pins holding the spindle boxes to their proper places, though any other of the well known modes can be used.

$h$, are the bolts or screws which fasten the hub boxes into the hub.

The advantages to be derived from this mode of constructing hub and spindle boxes, (or perhaps those being fastened on the spindle or arm of an axle, should be more properly called spindle bearing,) are of vast importance in several respects, a few of which I will name; first the shoulders of the spindle bearings and the shoulders of the hub boxes are entirely inside of the hub, where the oil is perfectly free from being dried or taken up by dust, mud or sand. Second, the spindle having boxes or bearings placed upon it in this manner, is entirely free from wear, consequently never become weaker from use, and in fact is a perpetual axle. Also the bearings being at each end of the spindle, any wear on the boxes does not cause a wheel to "wabble" like those spindles having a bearing on their whole length; and when these bearings should wear, so as not to work well, they can be replaced by new ones, with but trifling expense. Third the interior flange and groove makes the bearings almost double of those without them, while at the same time they are equally near the ends of the hub.

The hub boxes can be made in the ordinary way, of cast iron or any other metal; also the boxes or bearing on the spindle, can be made of any kind of metal, that may be desired; and to prevent the usual rattling noise, caused by boxes and washers of metal coming in contact with each other, leathern washers can readily be placed between the shoulders of the hub boxes and bearings on the spindle.

What I claim as my invention and desire to secure by Letters Patent is,

In combination a hub box with an interior groove and flange, as represented, the peculiar manner of constructing and placing upon the spindle, the spindle boxes or bearings, so as to properly fit into the above described hub boxes; all as represented in the accompanying specifications, in the manner, and for the purposes therein expressed.

R. W. McCLELLAND.

Attest:
M. S. MAUS,
JONATHAN HAINES.